United States Patent
Paul et al.

(10) Patent No.: US 6,457,651 B2
(45) Date of Patent: *Oct. 1, 2002

(54) DUAL MODE, DUAL INFORMATION, DOCUMENT BAR CODING AND READING SYSTEM

(75) Inventors: Peter Paul, Webster; Grace T. Brewington, Fairport, both of NY (US)

(73) Assignee: Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/410,986

(22) Filed: Oct. 1, 1999

(51) Int. Cl.[7] ............................................... G06K 19/06
(52) U.S. Cl. ...................... 235/494; 235/375; 235/456; 235/469
(58) Field of Search .............................. 235/494, 375, 235/462.09, 469, 456, 462.01, 472.01; 705/42, 43, 404, 405

(56) References Cited

U.S. PATENT DOCUMENTS

| | | | |
|---|---|---|---|
| 4,782,221 A | | 11/1988 | Brass et al. ................ 235/494 |
| 5,278,400 A | * | 1/1994 | Appel ........................ 235/494 |
| 5,291,243 A | | 3/1994 | Heckman et al. ........... 355/201 |
| 5,298,731 A | * | 3/1994 | Ett ............................ 235/494 |
| 5,444,779 A | * | 8/1995 | Daniele ........................ 380/3 |
| 5,486,686 A | | 1/1996 | Zdybel, Jr. et al. ......... 235/375 |
| 5,635,694 A | * | 6/1997 | Tuhro ....................... 235/494 |
| 5,684,885 A | * | 11/1997 | Cass et al. ................. 235/469 |
| 5,901,224 A | * | 5/1999 | Hecht .......................... 380/4 |
| 5,905,251 A | * | 5/1999 | Knowles ................ 235/472.01 |
| 5,951,055 A | * | 9/1999 | Mowry, Jr. .................. 283/93 |
| 6,000,613 A | * | 12/1999 | Hecht et al. ............... 235/494 |
| 6,076,738 A | * | 6/2000 | Bloomberg et al. ......... 235/494 |
| 6,256,638 B1 | | 7/2001 | Dougherty et al. ......... 707/104 |

FOREIGN PATENT DOCUMENTS

| | | | |
|---|---|---|---|
| EP | 0459792 | * | 12/1991 |
| EP | 0549315 A1 | * | 6/1996 |

* cited by examiner

Primary Examiner—Michael G. Lee
Assistant Examiner—Uyen-Chau N. Le

(57) ABSTRACT

A dual level encryption method, and document, for providing and obtaining a substantially increased amount of optically readable information from an otherwise conventional and highly visible printed bar code pattern area on a document without interfering with the conventional optical reading of the conventional information in the bar code, comprising integrally printing a second and very much finer pattern of encoded optically machine readable glyph code or other such indicia within the bar code pattern area, containing a much higher level of information, to provide two different levels of information within the same area. Scanning the bar code pattern with a conventional bar code reader extracts conventional bar coded information embedded in the bar code without interference from the second indicia. Scanning the same bar code pattern area with a different, higher resolution, optical scanner extracts the much greater amount of information from the second, much finer, optically readable indicia pattern.

7 Claims, 3 Drawing Sheets

DUAL MODE, DUAL INFORMATION, DOCUMENT BAR CODING AND READING SYSTEM

Figure 1:
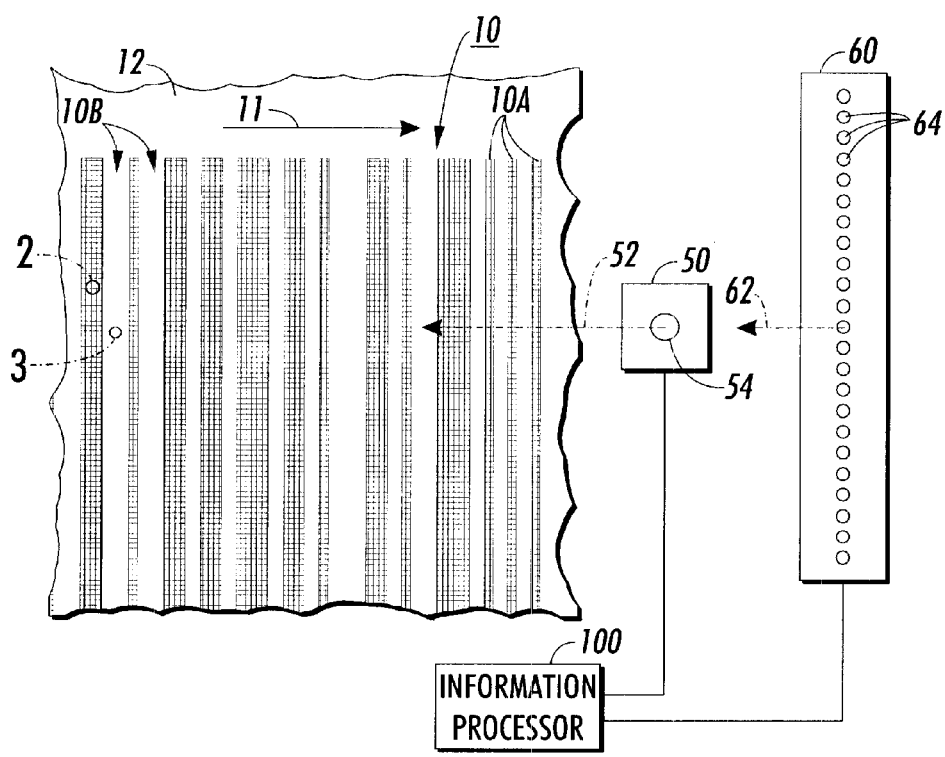

Disclosed is an embodiment of a plural-mode, plural information level, document encoding system and document. The document is printed with an integrated encoding of conventional bar coding information with its first level of bar code pattern information for optical reading by a conventional bar code reader, and integrally printed within the bar code pattern is a much finer and higher level information indicia pattern which does not interfere with the conventional bar code reading, yet is optically readable by a second, much higher resolution, optical reading system, to provide a much higher level of information from that second, much finer information indicia pattern. A high data density channel is thereby provided while maintaining the backward compatibility of the dual symbology to legacy bar code readers that are already in fielded systems.

It will be noted that many bar code readers can read multiple bar code symbologies, including readers that can read both one dimensional and two dimensional bar codes. There does not exist, however, a symbology which can be read by different kinds of readers at different data density levels.

Also in this manner, the user may be directed by the highly visible and well-recognized bar code pattern to provide scanning in the correct area or location of the document in which the other, much higher data density, indicia also exists, containing far more embedded information than can be provided by the bar code indicia itself, yet without any incompatibility or interference between these two optical data encoding and data reading systems.

The widespread prior art uses of digitally readable bar codes or their equivalents on almost any object or document is so ubiquitous as not to require discussion herein. They include common 1D and 2D bar codes, "checkerboard" codes, the UPS or "bulls eye" codes, etc.. Thus, it will be appreciated as to the terms "bar codes" and the "bars" of "bar codes", as those terms are used in this particular application, that such "bars" can be circular as well as linear in shape.

An important advantage of bar codes is that they are highly visible, distinctive, and universally known and recognizable. Thus, they provide a clear visual pointer to what area of a document or object bearing a bar code needs to be scanned.

However, for bar codes to be correctly read by any of various conventional bar code readers, which are typically simple low-resolution optical scanners with very limited image processing or enhancement, the bar coding pattern on the document requires a precisely defined pattern of multiple bars with clear, defined, "white spaces" in between the bars, with sharp, clear, boundary definitions and high contrast. Thus, the underprinting or overprinting of the bar code pattern areas of documents with other indicia is not normally allowed or considered appropriate.

Further by way of background, "glyph" encoding (also known under the proprietary names "DataGlyph" or "Smart Paper") of various printed documents is also known in the art for various applications. "Glyphs" are an embedded digitally readable font, in particular a very fine pattern of machine readable indicia, preferably in very fine patterns of angled slash-mark appearing fonts like "///\\///\\/\\//", etc., (only very much smaller than as shown here) to be printed on various hardcopy documents. The proposed substitution of glyphs for bar codes has been suggested in some glyph literature. However, "glyphs" are by their very nature typically intended to be optically invisible to the naked eye, not recognizable, not within a clearly defined or bounded area of a document, and are not well known to the public.

Xerox Corp. U.S. Pat. No. 5,291,243 issued Mar. 1, 1994 (D/92224) to Dean A. Heckman, et al, discloses a system of integrated two color security patterns for checks or other security document printing, to prevent forgery. That patent specifically discusses providing buried glyph copies of any of the desired check data in the check background pattern image [e.g., Col. 12 line 58 to Col. 13 line 38], and specifically cites and incorporates by reference several of the below-cited patents. This and other references provide teachings for those skilled in the art of how to combine a fine, high-density, pattern of glyph encoded information into other patterns, backgrounds, text, or pictures, which glyph patterns are deliberately, effectively invisible to the naked eye, but machine-readable with surprising accuracy by known special glyph readers scanning the document or analyzing the electronic image thereof and readily separating the glyph pattern from its image background pattern.

Also particularly noted by way of background descriptions of Glyphs is Xerox Corp. European patent Application No. 92311676.8 published Jun. 30, 1993 as Publication No. 0 549 315 A1 by David L. Hecht, et al. (D/91764). The paragraph bridging Cols. 5–6 suggests the use of distinctly colored glyphs. Some additional examples of prior art on Glyphs in general includes an EPO Glyphs application Publication No. 459 792 published Dec. 4, 1991 (D/89190), which lists several glyph utilities and applications. Its parent U.S. application continuation issued in the U.S. on Jan. 23, 1996 as U.S. Pat. No. 5,486,686.

Other issued Xerox Corp. Glyph patents include U.S. Pat. No. 5,091,966, 5,128,525; 5,168,147; 4,716,438; 4,728, 984; 4,757,348; 4,970,554, 5,060,980, 5,157,726, 5,221, 833; 5,245,165; 5,278,400; 5,315,098; 5,317,646, 5,448, 375, 5,449,895; 5,449,896, 5,453,605, 5,489,763, 5,521, 372; 5,537,223; 5,572,010; 5,576,532; 5,611,575; 5,684, 885; 5,706,099; 5,717,197; 5,761,686 and 5,771,245.

A further broadly glyph-related patent is Xerox Corp. U.S. Pat. No. 4,786,940 by J. Daniele. Also noted is J. Daniele U.S. Pat. No. 5,444,779 issued Aug. 22, 1995 (D/93027).

However, as noted, glyphs are effectively invisible to the naked human eye, and are not widely publicly understood, even if observed (unlike bar codes) and thus do not visually instruct a person wishing to scan a document as to where to scan the document in order to extract the imbedded (printed) information, i.e., which side and which area of the document to scan to extract the embedded glyph information. Likewise, there is normally no particular identified place on a document to print glyph information, much less a defined area of the document where the entire image background will normally (and very desirably for glyph information clarity and readability) be pure solid black and pure solid white areas.

It will be appreciated that the term "document" as used herein in reference to the printing of bar codes and glyphs thereon is not limited to conventional sheets of paper or plastic. In this application it also broadly encompasses packaging, labels, and various other printable image substrates.

A specific feature of the specific embodiments disclosed herein is to provide an encoded document encoded with a plural mode, plural information level, integrated encoding system, wherein said document is printed with two separately readable but integrally printed first and second optically readable indicia patterns; said first indicia pattern comprising an otherwise conventional bar code pattern of spaced-apart optically readable bars encoded with a first set of encoded information readable by a conventional bar code reader, and said second optically readable indicia pattern comprising a second pattern encoded with a second set of encoded information which contains a higher level of information than said first set of encoded information, said second, pattern of optically readable indicia being integral said bar code pattern and not optically readable by a conventional bar code reader but optically readable by a fine pattern optical reader, said fine pattern of optically readable indicia integral said bar code pattern being several times smaller in dimension than said spacing between said optically readable bars of said bar code pattern or the width of said bars.

Further specific features disclosed in the embodiment herein, individually or in combination, include those wherein said indicia of said second pattern of optically readable indicia integral said bar code pattern is at least 20 times smaller in area than the area of said spacing between said optically readable bars of said bar code pattern; and/or wherein said second optically readable indicia pattern is printed in thin glyphs integrally printed within said bar code pattern and/or wherein said second optically readable indicia pattern is a pattern of fine optically readable indicia which is within said optically readable bars of said bar code pattern; and/or wherein said second optically readable indicia pattern comprises a multiple fine spaced optically readable indicia pattern printed in between said spaced-apart optically readable bars of said bar pattern; and/or wherein at least one of said optically readable bars of said bar code pattern is formed by a dense pattern of said second optically readable indicia; and/or wherein said second optically readable indicia pattern is a different color than said bar code pattern.

Another disclosed feature of the embodiment is a dual encryption method for providing and obtaining a substantially increased amount of optically readable information from an otherwise conventional and highly visible bar code pattern on a document without interfering with the conventional optical reading of the conventional information in said bar code, comprising integrally embedding a second and finer pattern of encoded optically machine readable indicia within said bar code pattern, containing a higher level of information, to provide two different levels of information within a conventional bar code pattern, and scanning said bar code pattern with a conventional bar code reader to extract conventional bar coded information embedded in said bar code pattern, and also scanning said same bar code pattern with a different, higher resolution, optical scanner to extract said second optically readable indicia pattern therefrom; and/or wherein said second and much finer optical indicia pattern is a thin glyph code pattern; and/or wherein said second pattern comprises optical indicia at least 20 times smaller than said bar code pattern.

As to specific components of the subject apparatus, or alternatives therefor, it will be appreciated that, as is normally the case, some such components are known per se in other apparatus or applications which may be additionally or alternatively used herein, including those from art cited herein. All references cited in this specification, and their references, are incorporated by reference herein where appropriate for appropriate teachings of additional or alternative details, features, and/or technical background. What is well known to those skilled in the art need not be described here.

Figure 2:
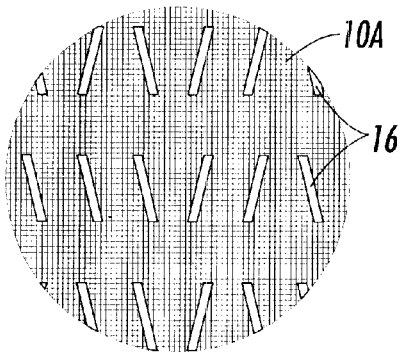
Figure 3:
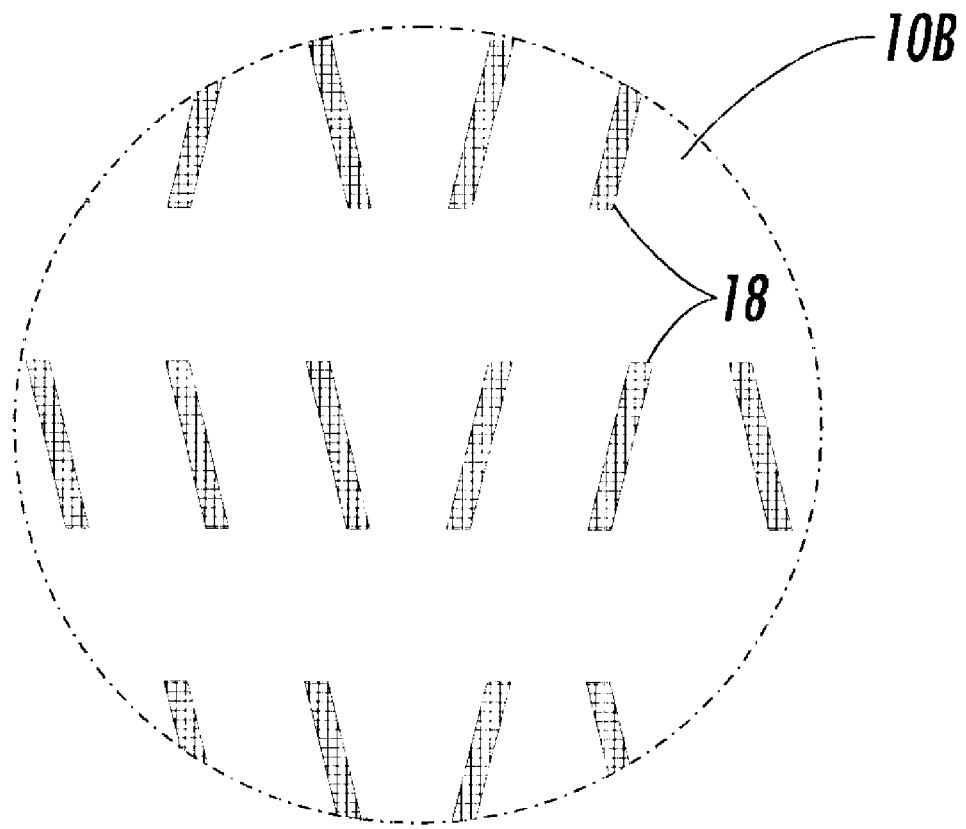
Figure 4:
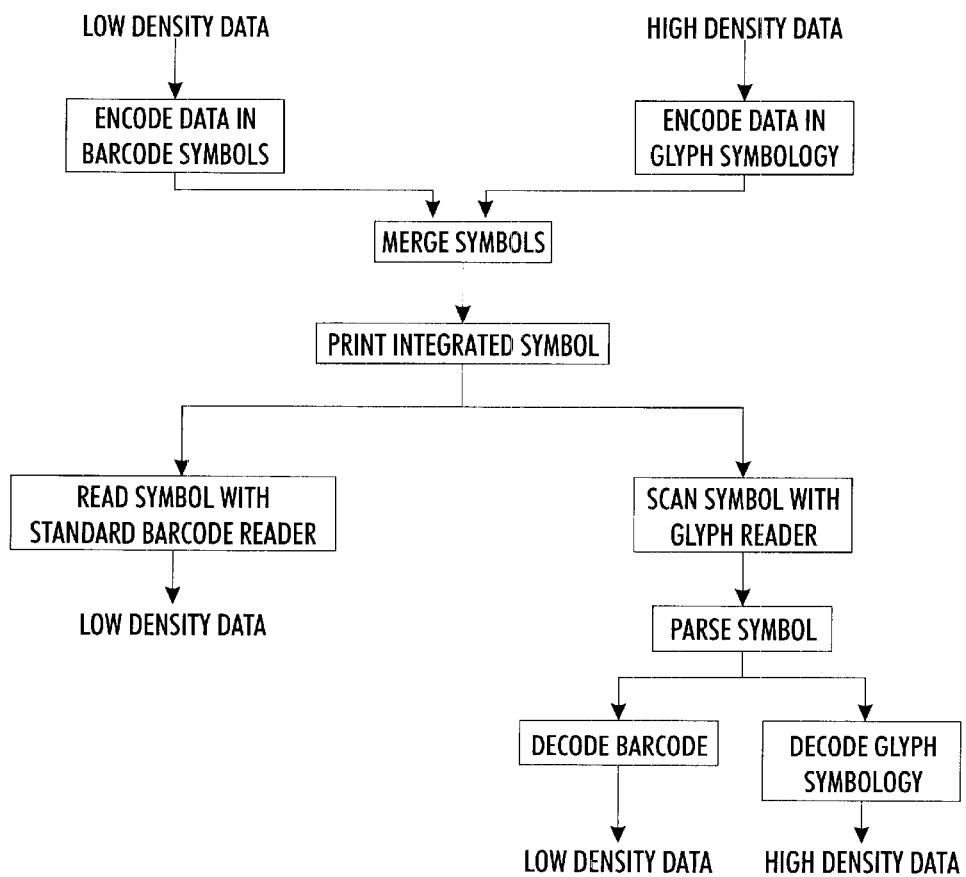

Various of the above-mentioned and further features and advantages will be apparent from the specific apparatus and its operation described in the examples below, and from the claims. Thus, the present invention will be better understood from this description of specific embodiments, including the drawing figures wherein:

FIG. 1 is an example of a conventional, highly-visible bar code pattern area for document, which bar code has integral effectively invisible (to the naked eye) fine glyph patterns of high-density information, in accordance with the present invention. This integrally dual encrypted document is shown with that bar coded area of the document being moved (illustrated solid movement arrows) past a conventional bar code reader and also past a separate, special, glyph code reader (both are shown schematically), or alternatively (as shown by their respective dashed line arrows) the document may be stationary and be separately scanned by the bar code reader and/or the special glyph code reader;

FIG. 2 shows a highly magnified small area portion of one of the bars of the bar code shown in FIG. 1, showing one example of the subject glyph data which may be integrally embedded therein, here, as glyph-shaped white spaces, which are invisible to the conventional bar code reader and do not interfere with its operation;

FIG. 3 is similar to FIG. 2 except that in this case the fine glyph pattern is shown printed in black and embedded into a small area of a white space in between adjacent bars of the bar code of FIG. 1 (shown to the same enlargement and showing the same portion of a glyph code data stream); and FIG. 4 is a flowchart illustrating one example of a dual mode, dual data density system for the embodiment of FIGS. 1–3 or other dual (low and high density) encoding and reading systems.

Referring to FIGS. 1–4, as noted, the particular bar code pattern and the particular glyphs illustrated therein are merely exemplary, and others are known, including those noted in the references cited above, and/or including those in distinctive colors (which, of course, cannot be shown in patent drawings). The illustrated bar code pattern is one very well known to those skilled in the art as well as members of the public at large. It should also be noted that the embodiments of FIGS. 2 and 3 can be alternatives, or they can both be used in the same bar code pattern. As also noted above, the generation, printing, reading and interpretation of both bar codes and glyphs is well known in the art and need not be re-described herein.

Referring to FIG. 1, as described above, an example of an otherwise conventional bar code pattern 10 is illustrated on a broken-away minor portion of a document 12. The bars themselves are 10A, and the "white spaces" between the bars are 10B.

Note that a bar code footprint or area also typically includes a "quiet zone" of white space preceding the first solid black line and following the last solid black line of the bar code pattern. This "quiet zone" is typically 6.4 mm (0.25 inches), and may (or may not) be specified by the ANSI X3.182 standard. In addition, a "quiet zone" of white space at the ends on the bar code lines (at the "top" and the "bottom" of the bar code) is also normally defined. It is important to note that both of those standard border regions of the bar code can be part of the bar code footprint, pattern, or area as described or claimed herein. For example, where we indicate that the glyphs or other higher data density indicia should preferably not extend beyond the bar code footprint.

It will also be appreciated, as well as known, that bar codes are normally printed with completely solid black bar code lines, with a pattern of wide black lines and narrower solid black lines separated by "white spaces" therebetween. However, since the U.S. Patent Office does not allow the use of solid black lines of such width in patent drawings, the solid black bar code lines throughout the drawings here are illustrated with the U.S. Patent Office approved crosshatching symbol for black.

As described above, either the document 12 can be moved relative to a conventional bar code reader (exemplified here schematically at 50) or vice versa. This is respectively illustrated by the solid line movement arrow 11 on the document 12 and the alternative dashed line movement arrow 52 associated with the conventional bar code reader 50. The conventional bar code reader 50 may of course have the usual, simple, low-resolution, conventional optical sensor 54, which may be conventionally connected to any various alternative information processors 100 in a known manner.

However, also shown schematically in FIG. 1 is a known type of high-resolution scanner or glyph reader 60, with an associated illustrative dashed line movement arrow 62, for separately or simultaneously scanning the bar code pattern 10. The glyph reader 60 may have a much finer pattern of multiple, optical sensors 64. These respective embedded information readers 50 and 60 may be either separate or combined scanning units or, alternatively, be stationary mounted for separate or integrated sequential movement of the document 12 bar code area 10 past the glyph sensor 60 and/or the bar code reader 50.

As explained in the above-cited references, the exemplary type of glyph information indicia encoding shown herein has a narrow and slanted strokes font, which is orientation insensitive and uncritical. Thus, the relative position or movement of the bar code pattern 10 relative to the glyph reader 60 can vary considerably from that illustrated in FIG. 1 and still provide accurate reading out of the embedded glyph symbols.

Turning now to FIG. 2, this is a greatly enlarged (by several orders of magnitude) minor portion of one of the black bars 10A of FIG. 1, showing a normally optically invisible (to the naked eye) exemplary pattern of white or colored (non-black) glyphs 16 which can be buried integrally within a minor portion of one bar 10A of the bar code pattern 10. Extrapolating also doing this over any desired amount of the rest of the entire bar or bar code footprint or area demonstrates the very high information level which can be embedded in this manner within the bar code area. It will be seen that the individual glyph strokes or binary characters may be greatly smaller than the area of a narrow standard bar code line 10A, in the range 10–500 or more times smaller in area, and preferably more than 20 times smaller in area, than any bar 10A, and also preferably substantially spaced apart from one another. The result is that none of the glyphs 16 are optically visible or detectable by a conventional low-resolution bar code sensor 50, nor do they change the macro optical characteristics of the bar code, and thus they do not effect the reading out of the bar coded information in any respect.

FIG. 3 shows a similar glyph high-density information encoding 18 in a similarly highly magnified view of a very minor portion of the bar code pattern 10 of FIG. 1. However, in this case the information is shown being glyph encoded in one of the white spaces 10B in between the dark bars 10A of the bar code pattern 10 by printing (conventionally) the glyph pattern therein (with the same or other dark printing ink or toner, or a different material).

Again, in this FIG. 3 embodiment, (which may be in addition to, or an alternative to, the FIG. 2 encryption of glyph patterns), the dark (or colored) printed glyphs 18 are so small in individual areas and so well spaced as compared to the area of underlying unprinted white or other light background, that they are optically invisible to the conventional bar code reader 50.

As is well known, glyph patterns are detectable even with their lines being generated by only a few printed pixels. The glyphs can be of only a single pixel line in width and still be detectable by the known glyph recognition software, which can be programmed into the information processor 100 from the signals detected by the glyph reader 60. The glyphs can be conventionally generated as high-resolution, binary amplitude modulated pixels in standard printing systems.

It is of course, desirable, and readily accomplished with the present invention, to simultaneously print the first or bar code pattern and the integral second or glyph pattern simultaneously in the same printing process with the same (or different) printing ink or toner by electronically superimposing the two images before electronic printing. As shown by the above-cited U.S. Pat. No. 5,291,243, and other patents above, this can be accomplished in a known manner by electronically merging the two images before they are printed.

It will be appreciated that the glyphs reader thresholding and/or background suppression settings may be different for reading white or colored glyphs on a black bar background area as compared to reading dark or colored glyphs on a white or light colored inter-bar space.

Multi-color printing and scanning can be used to enhance the distinction and readability of the second and higher level of information buried in the bar code. In addition, multi-color printing can be used to provide increased data density. For example, by using a very specific limited spectrum color for the glyphs in contrast to the typical black of the bar code pattern. The use of color for more precisely spectral signature distinction can be utilized in glyphs of a glyph code providing either a bistate or polystate characteristics, as suggested in, for example, the paragraph bridging columns 5–6 of the above-cited EPO Publication Number 0 549 315 A1. However, different colors should not be necessary for the low-resolution of the standard bar code reader to reject interference from a glyph code which can be 1 or 2 orders of magnitude or more finer than the bar code pattern.

Another alternative is to modify the glyph pattern by introducing an extra space or spaces between the glyph strokes or characters so as to have even less effect on the solid black or solid white background on which they are printed. Also, the glyph pattern may be printed either along the axis of the bar code lines 10A, or transverse thereto. In any case, it is desirable that the glyphs not extend beyond the perimeters defined by the bar code pattern and its surrounding "quiet zone".

The symbology has the property that an optical low pass filter operation (which is what the low resolution bar code reader does when it reads) can "blur" the fine symbols (such as glyphs) together to form a readable bar code signal. That is, the high density information itself may be printed densely enough, and in the right areas, to itself provide "bars" as seen by the bar code reader, (as opposed to printing otherwise solid bars with voids in the space of glyphs). That is, a "blurred" version of the combined printed high density indicia can provide the bar code "bars". For that embodiment, for glyph symbology, wider glyphs comprised of "slashes" made up of two or three pixels per row may be needed. For other high density symbols (not just conventional glyphs), various invented symbology may be used where a "blurred" high density symbology results in a readable bar code. Since a bar code reader has low optical resolution, it only reads a "blurred" version of the composite symbology which results in a readable bar code.

Another embodiment is where an invented symbology with spectrally limited high density symbology results in a readable bar code. Typically, bar code readers use red light emitting diodes (LEDs) (or other spectrally limited sources, or sensors) to read the bar codes. Thus, since the bar code reader can only "see" red, red "looks" white and green "looks" black to the bar code reader.

Note that different high density symbology could be used in the bar code bars and/or in the bar code spaces. For example, glyphs could be used in the bar code bars, while high resolution binary amplitude modulated pixels could be used in the bar code spaces. Thus, resulting in a hybrid information system.

It may be seen that the above-described system allows encoding and decoding in a machine-readable format of both high-density and low-density data, within the same area of a conventional bar coded document. The low-density (bar code) symbols may be decoded with a conventional low-density bar code reader, while the high-density data can be read with an advanced reader using a higher optical resolution power to download a much larger amount of information from the same document area, yet without interfering with correct reading of the bar coded data. The very small area and the spacing of the glyphs will not effect luminance and uniformity over the bars 10A or the white spaces 10B to any significant extent. The optical appearance of the bar code to the naked eye and the bar code reader will be essentially the same as a solid black and white bar code pattern, even though many thousands of glyph characters may be buried therein.

It will be appreciated that there are many documents for which it is not appropriate, for visual impression purposes, to impose a bar code thereon. However, there are also a great many documents in which bar codes are already present on the document for other reasons. The high visibility of bar codes and the public knowledge that they contain information which needs to be scanned, provides an easy visual instruction for the scanning on the bar code area by an unit which can also extract a great deal more information from the same bar coded area, by the disclosed system, providing the document has been encoded therewith.

It will be appreciated that in addition to the illustrated one-dimensional glyph code that two-dimensional glyph codes, such as wedge-shaped or small square block glyphs, may be utilized in some cases. However, the illustrated or other narrow glyphs are preferable.

It should be noted that standard one-dimensional bar code readers, and the requisite one-dimensional bar code symbology, are designed to be very robust to distortions and reading errors, such as bar codes printed on curved or odd-shaped surfaces, wrinkles, contamination, etc. This robustness or insensitivity is actually taken advantage of in the subject embedding of the high-density data therein, by making the latter undetectable to the bar code reader. The high-density data of the glyph encoding is, in effect, optically invisible or hidden from the standard bar code reader. The high-density data itself can be designed to be more robust by including error correction codes etc. Data glyph-like symbols with error correction codes have been shown to be very robust to distortions, as discussed in various of the above-cited patent references.

The present system, by maintaining complete backward compatibility to existing conventional bar code readers, does not require the modification or purchase of different equipment for bar code reading, yet allows for additional high-data density information to be encoded without any impact on the existing bar code system. One example would be special added tracking control data for inventory control over documents, which would only need to be read by a limited number of people with glyph readers capable of reading those glyph codes or other high-density indicia within the bar code. Thus, for example, a print shop operator who wishes to include an additional document verification system would not have to replace existing bar-code-based finisher or other controls for the print shop, but could have such additional information glyph encoded on the documents within the existing bar code information.

While the embodiments disclosed herein are preferred, it will be appreciated from this teaching that various alternatives, modifications, variations or improvements therein may be made by those skilled in the art, which are intended to be encompassed by the following claims.

What is claimed is:

1. A dual encryption method for providing and obtaining a substantially increased amount of optically readable information from an otherwise conventional and highly visible bar code pattern on a document without interfering with the conventional optical reading of the conventional information in said bar code, comprising integrally embedding a second and finer pattern of encoded optically machine readable indicia within said bar code pattern, containing a higher level of information, to provide two different levels of information within a conventional bar code pattern, and scanning said bar code pattern with a conventional bar code reader to extract conventional bar coded information embedded in said bar code pattern, and also scanning said same bar code pattern with a second and different optical scanner to extract said second optically readable indicia pattern therefrom;

wherein said conventional bar code pattern has conventional white spaces, and wherein said integrally embedded second and finer pattern of encoded optically machine readable indicia consists of multiple dark marks positioned within said white spaces of said bar code pattern, which dark marks are much smaller than said white spaces and provide non-interference with conventional optical reading of said conventional bar code pattern with said conventional bar code reader.

2. A dual encryption method for providing and obtaining a substantially increased amount of optically readable information from an otherwise conventional and highly visible bar code pattern on a document without interfering with the conventional optical reading of the conventional information in said bar code, comprising integrally embedding a second and finer pattern of encoded optically machine readable indicia within said bar code pattern, containing a higher level of information, to provide two different levels of information within a conventional bar code pattern, and scanning said bar code pattern with a conventional bar code reader to extract conventional bar coded information embedded in said bar code pattern, and also scanning said same bar code pattern with a second and different optical scanner to extract said second optically readable indicia pattern therefrom;

wherein said conventional bar code pattern has conventional dark bars, and wherein said integrally embedded second and finer pattern of encoded optically machine readable indicia consists of multiple light marks in said dark bars of said bar code pattern, which light marks are much smaller than said dark bars and provide non-interference with conventional optical reading of said conventional bar code pattern with said conventional bar code reader.

3. A dual encryption method for providing and obtaining a substantially increased amount of optically readable information from an otherwise conventional and highly visible bar code pattern on a document without interfering with the conventional optical reading of the conventional information in said bar code, comprising integrally embedding a second and finer pattern of encoded optically machine readable indicia within said bar code pattern, containing a higher level of information, to provide two different levels of information within a conventional bar code pattern, and scanning said bar code pattern with a conventional bar code reader to extract conventional bar coded information embedded in said bar code pattern, and also scanning said same bar code pattern with a second and different optical scanner to extract said second optically readable indicia pattern therefrom;

wherein said conventional bar code pattern has conventional white spaces, and wherein said integrally embedded second and finer pattern of encoded optically machine readable indicia consists of multiple color marks positioned within said white spaces of said bar code pattern, which color marks are much smaller than said white spaces and provide non-interference with conventional optical reading of said conventional bar code pattern with said conventional bar code reader.

4. A dual encryption method for providing and obtaining a substantially increased amount of optically readable information from an otherwise conventional and highly visible bar code pattern on a document without interfering with the conventional optical reading of the conventional information in said bar code, comprising integrally embedding a second and finer pattern of encoded optically machine readable indicia within said bar code pattern, containing a higher level of information, to provide two different levels of information within a conventional bar code pattern, and scanning said bar code pattern with a conventional bar code reader to extract conventional bar coded information embedded in said bar code pattern, and also scanning said same bar code pattern with a second and different optical scanner to extract said second optically readable indicia pattern therefrom;

wherein said conventional bar code pattern has conventional dark bars, and wherein said integrally embedded second and finer pattern of encoded optically machine readable indicia consists of multiple colored marks overwritten on said dark bars of said bar code pattern, which colored marks are much smaller than said dark bars and provide non-interference with conventional optical reading of said conventional bar code pattern with said conventional bar code reader.

5. A dual encryption method for providing and obtaining a substantially increased amount of optically readable information from an otherwise conventional and highly visible bar code pattern on a document without interfering with the conventional optical reading of the conventional information in said bar code, comprising integrally embedding a second and finer pattern of encoded optically machine readable indicia within said bar code pattern m, containing a higher level of information, to provide two different levels of information within a conventional bar code pattern, and scanning said bar code pattern with a conventional bar code reader to extract conventional bar coded information embedded in said bar code pattern, and also scanning said same bar code pattern with a second and different optical scanner to extract said second optically readable indicia pattern therefrom;

wherein said integrally embedded second and finer pattern of high density indicia is grouped to form the dark bars of said conventional bar code pattern readable by said conventional bar code reader.

6. A dual encryption method for providing and obtaining a substantially increased amount of optically readable information from an otherwise conventional and highly visible bar code pattern on a document without interfering with the conventional optical reading of the conventional information in said bar code, comprising integrally embedding a second and finer pattern of encoded optically machine readable indicia within said bar code pattern, containing a higher level of information, to provide two different levels of information within a conventional bar code pattern, and scanning said bar code pattern with a conventional bar code reader to extract conventional bar coded information embedded in said bar code pattern, and also scanning said same bar code pattern with a second and different optical scanner to extract said second optically readable indicia pattern therefrom;

wherein said conventional bar code pattern has conventional dark bars and intervening white spaces, and wherein said integrally embedded second and finer pattern of high density indicia comprises a first pattern encoding in said dark bars and a second and different pattern encoding in said white spaces.

7. The dual encryption method of claim 6, wherein said first encoding for said dark bars is a glyph code pattern.

* * * * *